(12) United States Patent
Kojima

(10) Patent No.: US 6,361,463 B1
(45) Date of Patent: Mar. 26, 2002

(54) DRIVE TRANSMISSION FOR VEHICLES

(75) Inventor: Masaaki Kojima, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 09/557,898

(22) Filed: Apr. 21, 2000

(30) Foreign Application Priority Data

May 17, 1999 (JP) .......................................... 11-135423

(51) Int. Cl.$^7$ .............................................. F16H 47/04
(52) U.S. Cl. ...................................................... 475/79
(58) Field of Search .................... 475/78, 79; 74/730–1, 74/733.1

(56) References Cited

U.S. PATENT DOCUMENTS

| | | | | |
|---|---|---|---|---|
| 4,843,907 A | * | 7/1989 | Hagin et al. .................... | 475/79 |
| 5,129,867 A | * | 7/1992 | Fredriksen et al. ............ | 475/79 |
| 5,156,577 A | * | 10/1992 | Fredriksen et al. ............ | 475/74 |

FOREIGN PATENT DOCUMENTS

JP          54013131          1/1979

* cited by examiner

*Primary Examiner*—Dirk Wright
(74) *Attorney, Agent, or Firm*—Jordan and Hamburg LLP

(57) ABSTRACT

The present invention provides a drive transmission for vehicles, which is interposed in a driving power transmission line extending from a driving power source to driving wheels, which includes a main driving shaft, a hydrostatic transmission (HST), a mechanical transmission and a planetary gear device. An input shaft of the HST is adapted to receive a part of driving power of the driving power source, which is branched from the main driving shaft, and the output shaft of the HST is adapted to output the driving power variable in response to the operation of the volume varying operation member. A driving shaft of the mechanical transmission is adapted to receive a part of the driving power from the driving power source via the main driving shaft. The planetary gear device includes a sun gear non-rotatably coupled to the output shaft of the HST, a carrier non-rotatably coupled to the driven shaft, planet gears in mesh with the sun gear to be moved therearound according to the rotation of the carrier, and an outer ring with an internal gear in mesh with the planet gears, in which the driving power to be transmitted to the driving wheels is taken out of the outer ring.

7 Claims, 9 Drawing Sheets

DRIVE TRANSMISSION FOR VEHICLES

BACKGROUND OF THE INVENTION

Background of the Invention

The present invention relates to a drive transmission for vehicles, which is interposed in a driving power transmission line extending from a driving power source to driving wheels. More specifically, the present invention relates to a drive transmission for vehicles that is equipped with a hydrostatic transmission (hereinafter referred to as HST) and a mechanical transmission.

The drive transmission equipped with the HST and the mechanical transmission is well-known as disclosed, for example, in an unexamined Japanese Patent Publication No. 13131/1979.

The drive transmission as disclosed in the above publication is constructed so that all the driving force from the driving power source is input to the mechanical transmission through the HST, in which the mechanical transmission stepwisely varies the speed and the HST non-stepwisely varies the speed within each speed stage of the mechanical transmission.

However, the prior drive transmission is disadvantageous in the fact that all the driving force from the driving power source is input to the mechanical transmission through the HST, for which both the mechanical transmission and the HST need to have sufficient capacities to receive the maximum output of the driving power source. Consequently, the downsizing of both the mechanical transmission and the HST is hardly made.

SUMMARY OF THE INVENTION

The present invention has been conceived to solve the above problem. It is an object of the present invention to provide a drive transmission equipped with the HST and the mechanical transmission that can be made as compact as possible.

To achieve the above object, there is provided a drive transmission for vehicles which is interposed in a driving power transmission line extending from a driving power source to driving wheels, which includes a main driving shaft, an HST, a mechanical transmission and a planetary gear device.

The main driving shaft is operatively coupled to the driving power source.

The HST includes a hydraulic pump with an input shaft and a hydraulic motor with an output shaft, in which at least one of the hydraulic pump and the hydraulic motor are of a variable-displacement type that includes a volume varying operation member. The input shaft is adapted to receive a part of driving power of the driving power source, which is branched from the main driving shaft, and the output shaft is adapted to output the driving power variable in response to the operation of the volume varying operation member.

The mechanical transmission includes a driving shaft and a driven shaft disposed in parallel with the driving shaft so as to stepwisely vary the speed between both shafts. The driving shaft is adapted to receive a part of the driving power from the driving power source via the main driving shaft.

The planetary gear device includes a sun gear non-rotatably coupled to the output shaft of the HST, a carrier non-rotatably coupled to the driven shaft, planet gears in mesh with the sun gear to be moved therearound according to the rotation of the carrier, and an outer ring with an internal gear in mesh with the planet gears, in which the driving power to be transmitted to the driving wheels is taken out of the outer ring.

According to the drive transmission of the above arrangement, the driving power of the driving power source is branched to the HST and the mechanical transmission, thereby reducing the load applied to the HST and the mechanical transmission, and hence accomplishing the downsizing of the HST and the mechanical transmission as well as the prevention of malfunctions of the transmission.

Since the mechanical transmission receives only the part of the driving power from the driving power source, the downshift or upshift speed variable of the mechanical transmission can be limited as compared with the prior drive transmission, even if the mechanical transmission is shifted to a different speed stage during the vehicle runs.

Preferably, the drive transmission further includes a driving speed changer for operating the volume varying operation member; and a detecting device for detecting the manipulated variable of the driving speed changer, so that the mechanical transmission is shifted to a different speed stage based upon signals from the detecting device.

According to the above arrangement, a single driving speed changer is enough to operate both the HST and the mechanical transmission. This can improve the operationality of the drive transmission.

BRIEF DESCRIPTION OF THE DRAWINGS

The above, and other objects, features and advantages of the present invention will become apparent from the detailed description thereof in conjunction with the accompanying drawings wherein.

FIG. 8(*c*) is a rate vector diagram of the planetary gear device when the mechanical transmission is in a second speed stage.

DETAILED DESCRIPTION OF THE PREFERRED EMBODIMENT

Figure 1:
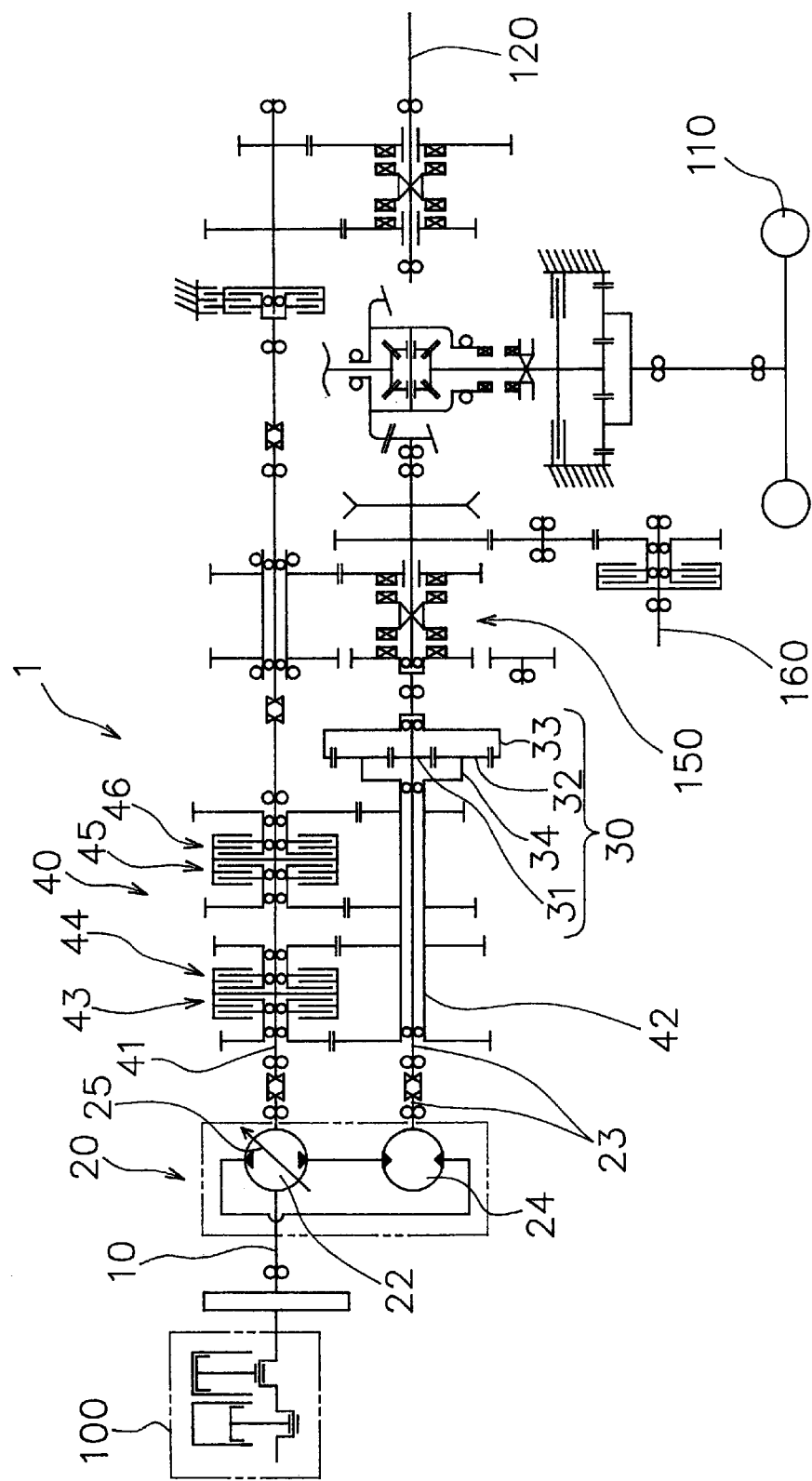
FIG. 1 is a view showing a driving power transmission line of a vehicle, to which a first embodiment of the drive transmission of the present invention is applied.
Figure 2:
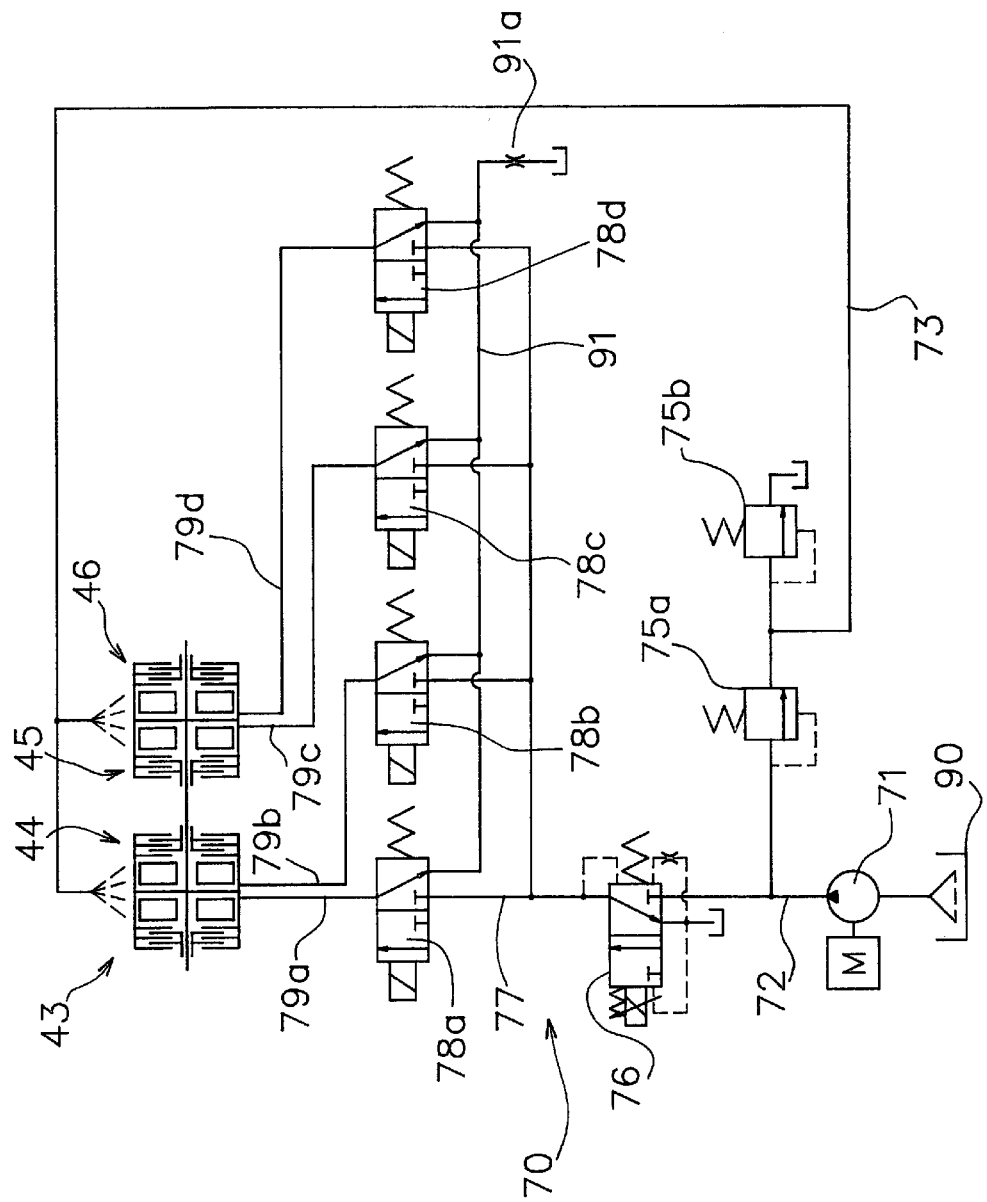
FIG. 2 is a hydraulic circuit diagram of the associated parts to the drive transmission of FIG. 1.
Figure 3:
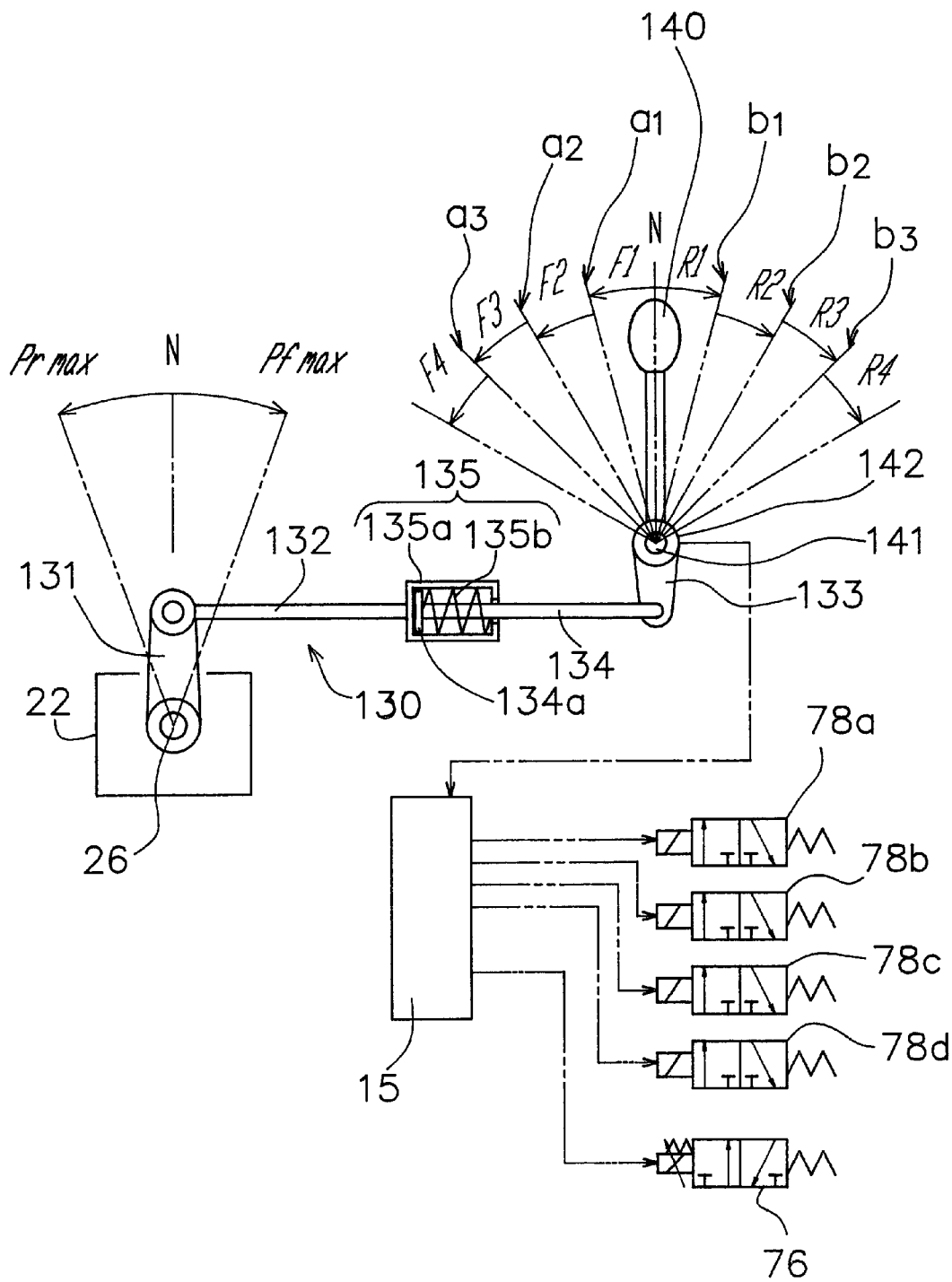
FIG. 3 is a block diagram of the associated parts to the drive transmission of FIG. 1.

Embodiments of the drive transmission for vehicles according to the present invention will be hereinafter described with reference to the accompanying drawings. FIG. 1 is a view showing the driving power transmission line of a vehicle, which is equipped with a transmission 1 according to a first embodiment of the present invention. FIGS. 2 and 3 are respectively a hydraulic circuit diagram and a block diagram of the associated parts in the drive transmission 1.

The drive transmission 1 is designed to be interposed within a driving power transmission line extending from a driving power source 100 to driving wheels 110. The drive transmission 1 includes a main driving shaft 10 operatively coupled to the driving power source 100, an HST 20 for receiving a part of the driving power of the driving power source 100 branched through the main driving shaft 10, a mechanical transmission 40 including a driving shaft for receiving a part of the driving power of the driving source 100 branched through the main driving shaft 10 and a driven shaft 42 disposed substantially in parallel with the driving shaft 41, so as to stepwisely varying the speed between both shafts 41 and 42, and a planetary gear device 30 disposed in the downstream side of the HST.

In FIG. 1, reference numerals 120, 160 and 150 respectively represent a PTO shaft for taking off the driving power of a traction machine such as a farm tractor of a rotary type, a PTO shaft for taking off the power to be transmitted to the rear wheels, and a mechanical type forward/rearward movement switching mechanism. A clutch in the mechanical type forward/rearward movement switching mechanism may be of a gear sliding type, constant mesh type, friction type, hydraulic multiplate type or the like.

The HST 20 includes a hydraulic pump 22 for receiving a part of the driving power of the driving power source 100 directly from the main driving shaft 10, and a hydraulic motor 24 with an output shaft 23, in which at least one of the hydraulic pump 22 and the hydraulic motor 24 are of a variable-displacement type that the suction/discharge volumes are variable in response to the operation of a volume varying operation member. The volume varying operation member of this embodiment includes a swash plate 25 that tilts to vary the suction/discharge volumes. In this embodiment, the hydraulic pump 22 is illustrated as being of the variable-displacement type. The main driving shaft 10 has a rear end portion extending towards the downstream side of the driving power transmission line through the hydraulic pump 22. On the other hand, the HST has the output shaft 23 extending to the downstream side of the driving power transmission line.

Figure 4:
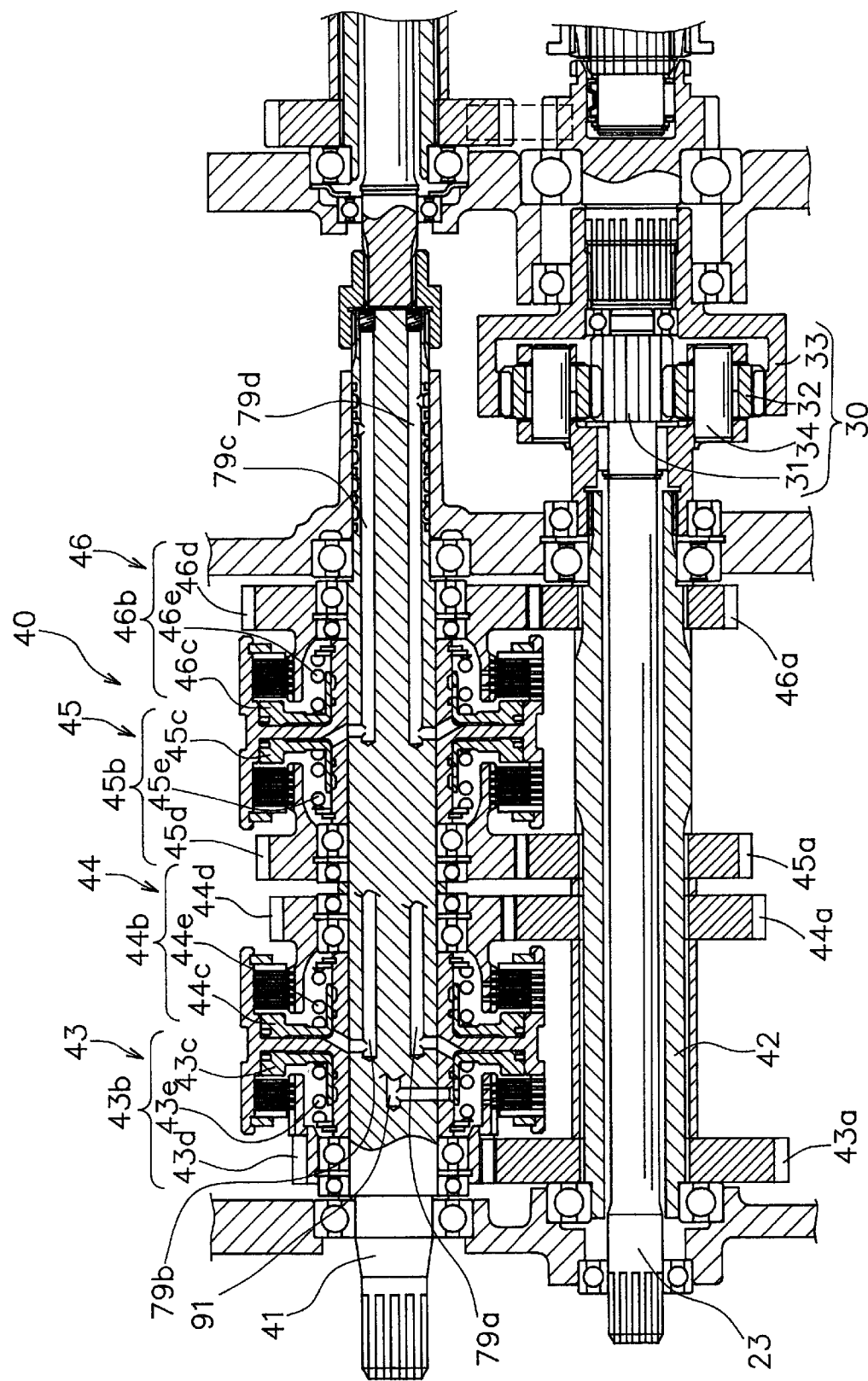
FIG. 4 is a longitudinal cross section of a mechanical transmission, a planetary gear device and their vicinities in the drive transmission of FIG. 1.

FIG. 4 is a longitudinal cross section of the mechanical transmission 40, the planetary gear device 30 and their vicinities. As illustrated in FIGS. 1 and 4, the mechanical transmission 40 has the driving shaft 41 disposed coaxially to the main driving shaft 10, and coupled to the main driving shaft 10 in non-rotatable manner around the axis thereof, enabling the mechanical transmission 40 to receive a part of the driving power from the driving power source 100 via the main driving shaft 10. The driving shaft 41 has a rear portion coupled to the driving power transmission line of a PTO system to transmit the driving power to the PTO shaft 120 via the driving shaft 41. On the other hand, the driven shaft 42 is of a cylindrical shape forming a shaft hole therein for rotatably receiving the output shaft 23 of the HST 20. The output shaft 23 may be formed by plural shafts non-rotatably coupled to each other in a non-rotatable manner, as illustrated in FIG. 1, or formed as an integrated shaft.

The mechanical transmission 40 also includes a plurality of power shift devices 43 to 46 for varying the speed between the driving shaft 41 and the driven shaft 42, thereby stepwisely varying the speed between the driving shaft 41 and the driven shaft 42. The mechanical transmission 40 of this embodiment includes four power shift devices to accomplish a four speed mode operation.

The power shift devices 43 to 46 respectively include fixed gears 43a to 46a non-rotatably supported on either one of the driving shaft 41 and the driven shaft 42, and clutch devices 43b to 46b supported on the remaining shaft.

The clutch devices 43b to 46b respectively include pressingly moved members 43c to 46c supported on the remaining shaft in a non-rotatable manner thereto and non-slidable manner along the axis, and idle gears 43d to 46d supported on the remaining shafts in a rotatable manner thereto and slidable manner along the axis, and disposed in such a manner as to be in meshed engagement with the fixed gears 43a to 46a. The pressingly moved members 43c to 46c, and the idle gears 43d to 46d respectively include corresponding clutch plates.

The clutch devices 43b to 46b also include urging members 43e to 46e for urging the respective clutch plates of the pressingly moved members and the idle gears towards such a direction as to move the corresponding clutch plates away from each other, thereby bringing the clutch plates of the pressingly moved members and the idle gears into and out of engagement with each other by the effect of hydraulic pressure.

The mechanical transmission 40 is designed to obtain the change gear ratio corresponding to the teeth number ratio between the idle gears 43d to 46d of a selected one of the power shift devices and the fixed gears 43a to 46a corresponding to the said idle gears.

In this embodiment, the fixed gears 43a to 46a are located on the driven shaft 42, while the clutch devices 43b to 46b are located on the driving shaft 41, as illustrated in FIGS. 1 to 4. This arrangement has been made in consideration of oil passages 79a to 79d, and 91.

Specifically, the driven shaft 42 of this embodiment is hollowed as described above. Therefore, when the clutch devices 43b to 46b are to be disposed on the hollowed driven shaft 42, there arise needs to form the oil passages 79a to 79b and 91 in the wall of the driven shaft 42, and hence to form the driven shaft with a much thicker wall. Such an increase of the wall thickness invites a larger outer diameter of the driven shaft 42, and hence lengthens the distance between the driving shaft 41 and the driven shaft 42. This results in a larger sized mechanical transmission 40.

Contrarily to the above, the location of the clutch devices 43b to 46b on the solid driving shaft 41 according to this embodiment does not pose the aforementioned problem, and hence accomplishes a compactness of the mechanical transmission 40, and easiness of forming the oil passages, leading to reduced manufacturing cost.

Figure 5:
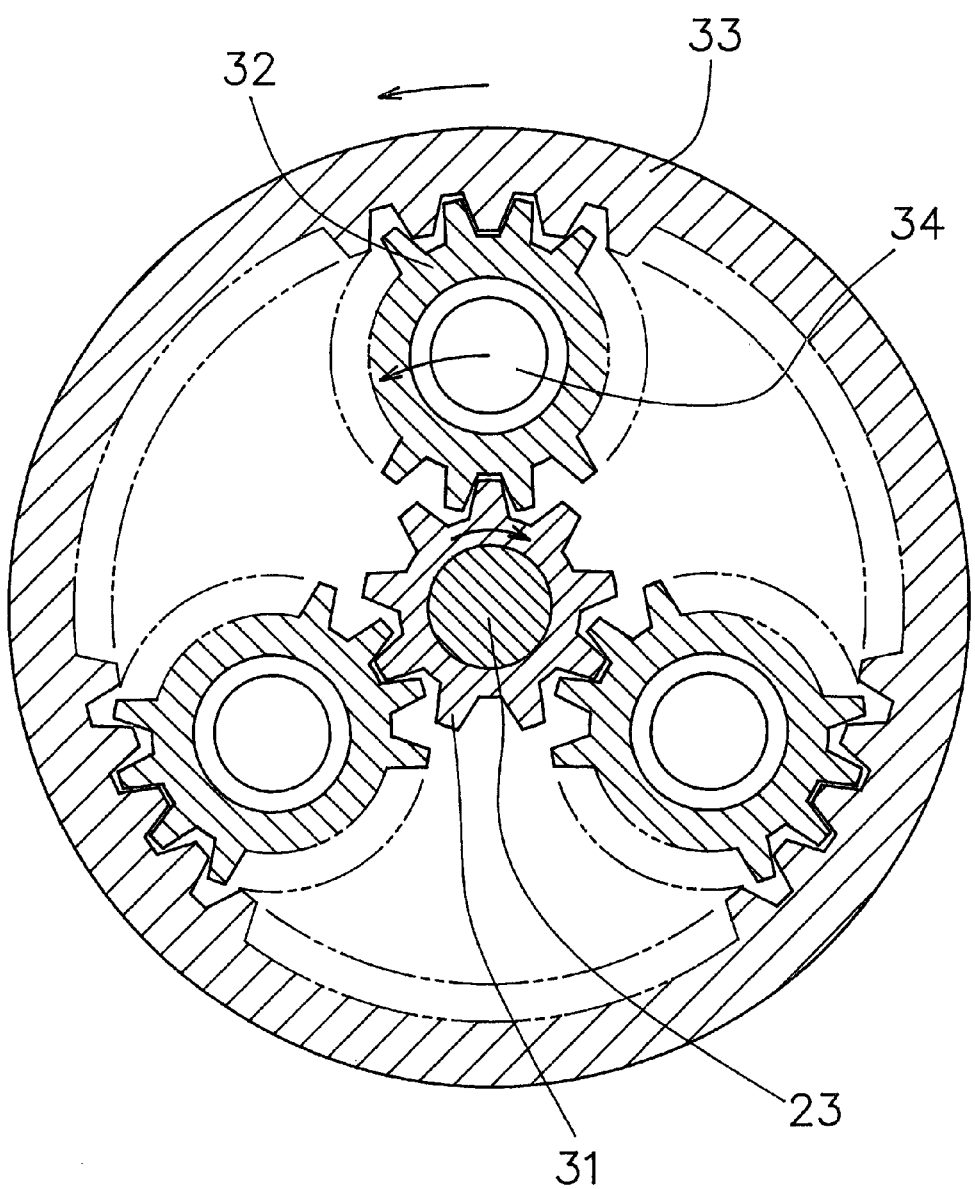
FIG. 5 is a lateral cross section of the planetary gear device in the drive transmission of FIG. 1.

FIG. 5 is a lateral cross section of the planetary gear device 30. As illustrated in FIGS. 1 and 5, the planetary gear device 30 includes a sun gear 31 non-rotatably supported on the output shaft 23 of the HST, planet gears 32 in mesh with the sun gear 31 to be moved therearound, a carrier 34 non-rotatably coupled to the driven shaft 42 and rotatable according to the orbital movement of the planet gears 32, and an outer ring 33 formed with an internal gear in mesh with the planet gears 32, so that the driving power to be transmitted to the driving wheels can be taken out of the outer ring 33.

The arrows of FIG. 5 respectively represent the rotational directions of the outer ring 33, the carrier 34 and the sun gear 31, when the output of the HST 20 is forwardly rotated in the arrangement as illustrated in FIG. 1. These rotational directions can be properly set according to a given arrangement of the driving force transmission mechanism from the driving power source to the planetary gear device 30.

The planetary gear device 30 of this embodiment is, as illustrated in FIG. 1, disposed in the downstream side of the mechanical transmission 40 in consideration of the efficiency of power take-off. Specifically, in this embodiment, the planetary gear device 30 is disposed in the downstream side of the mechanical transmission 40, so that the outer ring 33 of the planetary gear device 30 can be coupled directly to the forward/rearward movement switching mechanism 150. When a driving force transmission mechanism is additionally provided for connection between the outer ring 33 and the forward/rearward movement switching mechanism 150, the planetary gear device 30 can also be disposed between the HST 20 and the mechanical transmission 40.

A hydraulic circuit 70 of the mechanical transmission 40 will now be described with reference mainly to FIGS. 2 and 3.

The hydraulic circuit 70 includes a hydraulic pump 71 used for the mechanical transmission to suck the oil from an oil tank 90 and discharge the pressurized oil, and a pressurized oil line 72 for the mechanical transmission, through which the pressurized oil discharged from the hydraulic pump 71 flows. A lubricant line 73 is branched from the pressurized oil line 73 in the downstream side of a relief valve 75a for setting the operating oil pressure in the pressurized oil line. The lubricant line 73 is designed to feed lubricant to the power shift devices 43 to 46. In FIG. 2, a reference numeral 75b represents a relief valve for setting the lubricant pressure in the lubricant line 73.

On the other hand, the pressurized oil line 72 can be connected to an operational oil line 77 via an electromagnetic proportional valve 76. The operational oil line 77 is branched into four lines. The electromagnetic proportional valve 76 has a function to prevent a rapid increase of the hydraulic pressure in the operational oil line 77 at the time of connection between the pressurized oil line 72 and the operational oil line 77.

The rear ends of the lines branched from the operational oil line 77 are respectively connected, via first to fourth selector valves 78a to 78d, to first to fourth suction lines 79a to 79d whose rear ends are respectively coupled to the power shift devices 43 to 46. The first to fourth selector valves 78a to 78b respectively take pressurized oil feeding positions for connecting the operational oil line 77 respectively to the first to fourth suction lines 79a to 79d, and pressurized oil discharging positions for connecting the first to fourth suction lines 79a to 79d to the discharge line 91.

In FIG. 2, a reference numeral 91a represents a flow regulating valve interposed in the discharge line 91 to prevent the rapid decrease of the hydraulic pressure in the suction lines 79a to 79d connected to the discharge line 91.

The mechanism for interlocking together the respective components of the drive transmission will now be described with reference mainly to FIG. 3. In FIG. 3, a reference numeral 26 is a pump volume regulating shaft, which constitutes a part of the volume varying operation member, and which is rotated to tilt the swash plate of the hydraulic pump 22.

The pump volume regulating shaft 26 is designed to be associated, via a link mechanism 130, with an driving speed changer disposed near the driver seat. As illustrated in FIG. 3, in this embodiment, the driving speed changer is in the form of a gearshift lever 140. Specifically, the shaft 26 of this embodiment is coupled to a gearshift lever-supporting shaft 141 for supporting the gearshift lever 140, via the link mechanism 130.

The link mechanism 130 includes a swash-plate-side shifter 131 having a proximal end portion non-rotatably supported on the pump volume regulating shaft 26, a swash-plate-side coupling rod 132 having a first end coupled to an outer end portion of the swash-plate-side shifter 131, a lever-side shifter 133 having a proximal end portion non-rotatably supported on the gearshift lever-supporting shaft 141, a lever-side coupling rod 134 having a first end coupled to the lever-side shifter 133 and disposed coaxially to the swash-plate-side coupling rod 132, and a connection member for connection between a second end of the swash-plate-side coupling rod 132 and a second end of the lever-side coupling rod 134.

In this embodiment, the connection member is in the form of a torsion spring mechanism 135, which includes a cylindrical casing 135a with open and closed ends, as illustrated in FIG. 3. The closed end of the casing 135a is coupled to the second end of the swash-plate-side coupling rod 132. On the other hand, the second end of the lever-side coupling rod 134 is inserted into the casing 135a through the open end thereof. The torsion spring mechanism 135 includes a coil spring 135b within the casing 135a. The coil spring 135b is held between a detent piece 134a disposed on the second end of the lever-side coupling rod 134 and a flange member formed around the open end of the casing 135a.

The gearshift lever-supporting shaft 141 is equipped with a potentiometer 142 connected to a controller 15, for receiving signals representing the manipulated variable (the pivoting angles in this embodiment) of the gearshift lever 140.

As described above, the mechanical transmission of this embodiment is of a four-shift mode operation type. Specifically, a forward rotation region and a rearward rotation region of the HST are respectively divided into four zones. More specifically, the forward rotation region of the HST is divided into an F1 zone, F2 zone, F2 zone and F4 zone, while the rearward rotation region of the HST is divided into an R1 zone, R2 zone, R3 zone and R4 zone. The controller 15 is designed to determine, based upon the signals from the potentiometer 142, that the gearshift lever 140 has reached a boundary point of the adjacent tilting zones in either the forward or rearward rotation region, more specifically to determine, based upon those signals, that the gearshift lever 140 has reached points a1, a2 and a3 in the forward rotation region, or points b1, b2 and b3 in the rearward rotation region.

When the gearshift lever 140 is in a neutral position (position N in FIG. 3), the swash plate of the hydraulic pump 22 is also brought into a neutral position, at which the driving power is not output from the HST 20. The gearshift lever 140 is also designed to be associated with the mechanical type forward/rearward movement switching mechanism 150 as illustrated in FIG. 1. Specifically, when the gearshift lever 140 is in the neutral position, the forward/rearward movement switching mechanism 150 is in a shut-off state or inoperable state. When the gearshift lever 140 is pivoted to the forward movement zone (the F1 zone, F2 zone, F3 zone and F4 zone in FIG. 3), the forward/rearward movement switching mechanism 150 brings a forward movement mode into an engaging state. When the gearshift lever 140 is pivoted to the rearward movement zone (the R1 zone, R2 zone, R3 zone and R4 zone in FIG. 3), the forward/rearward movement switching mechanism 150 brings a rearward movement mode into an engaging state.

The description will be hereinafter made for the driving power transmission mechanism of the drive transmission 1 by taking, for example, the case (i) where the gearshift lever 140 is shifted from the neutral position to the F1 zone, and is further tilted within the F1 zone, and the case (ii) where the gearshift lever 140 is shifted from the F1 zone to the F2 zone, and is further tilted within the F2 zone.

Case (i)

As described above, when the gearshift lever 140 is in the neutral position, the forward/rearward movement switching mechanism 150 is in the shut-off state or inoperable state. Therefore, the driving power from the driving power source 100 is not transmitted to the driving wheels 110, so that the vehicle is still in a stopping state.

When the gearshift lever 140 is then pivoted to the F1 zone, the controller 15 detects the pivoting motion of the gearshift lever 140 based upon the signals from the potentiometer 142 so as to correspondingly output a connecting signal to the electromagnetic proportional valve 76, as outputting such a signal as to allow the first selector valve 78a to take its pressurized oil feeding position.

Figure 6:
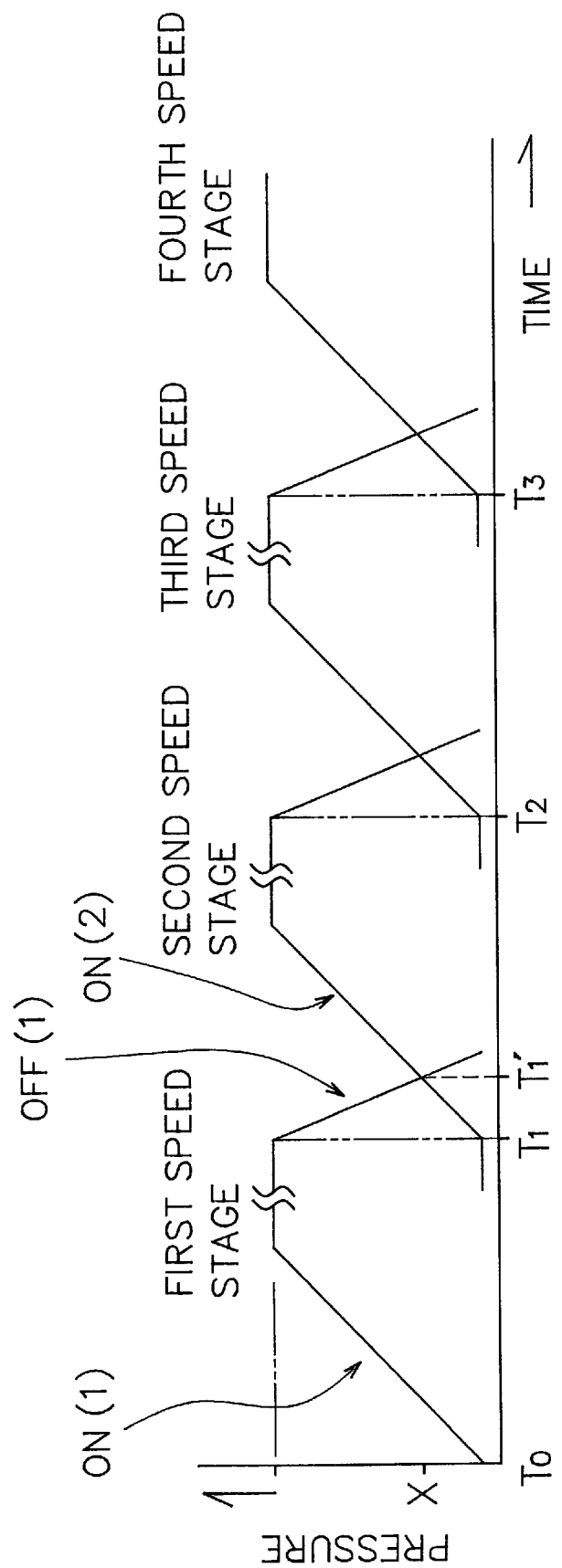
FIG. 6 is a waveform diagram showing change in hydraulic pressure of an operational oil line with respect to the elapsed time, in a hydraulic circuit for the mechanical transmission.

FIG. 6 illustrates a hydraulic pressure changing rate of the operational oil line 77 with respect to the elapsed time, in which the times respectively corresponding to the pivoting positions a1, a2 and a3 are represented by T1, T2 and T3.

Since the electromagnetic proportional valve 76 prevents the rapid increase of the hydraulic pressure in the operational oil line 77, as described above, the hydraulic pressure in the operational oil line 77 and the first suction line 79a communicating thereto is gradually increased, as indicated by ON (1) in FIG. 6. This prevents clutch disks of the power shift device 43 for the first speed stage, which device is actuated by the pressurized oil from the first suction line 79a, from being abruptly engaged with each other, thereby effectively preventing damages, abnormal abrasion and the like of the clutch disks.

On the other hand, during the gearshift lever 140 is positioned in the F1 zone, or the mechanical transmission is in the first speed stage, the lever-side coupling rod 134 and the swash-plate-side coupling rod 132 are integrally moved by the urging force of the coil spring 135b. Specifically, during the gearshift lever 140 is positioned in the F1 zone, the swash plate 25 of the hydraulic pump 22 is tilted according to the manipulated variable of the gearshift lever 140 to increase the output of the HST 20. In this embodiment, the swash plate 25 of the hydraulic pump 22 is adjusted to tilt from the position to the maximum tilting position (Pfmax position) in response to the pivotal movement of the gearshift lever 140 from the position N to the point a1.

The description will now be made for the movement of the planetary gear device 30 with reference mainly to FIGS. 1 and 5. The sun gear 31 of the planetary gear device 30 is non-rotatably coupled to the output shaft 23 of the HST 20, as described above. The sun gear 31 of the planetary gear device 30 increases the rotational speed, as the HST 20 increases the output.

On the other hand, the carrier 34 of the planetary gear device 30 is coupled to the driven shaft 42 of the mechanical transmission, as described above. The rotational speed of the carrier 34 is thus determined according to the speed stages of the mechanical transmission.

Figure 8:
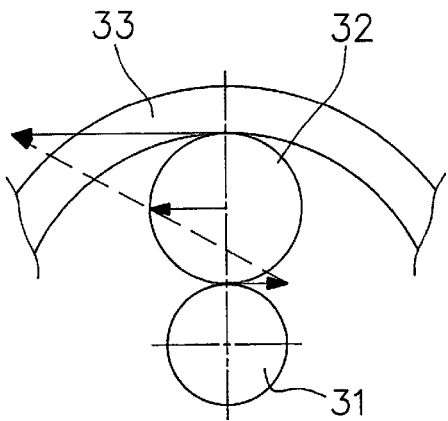
FIGS. 8(*a*) and 8(*b*) are rate vector diagrams of the planetary gear device respectively with the HST in small output power and the HST in large output power, when the mechanical transmission is in a first speed stage.
Figure 8:
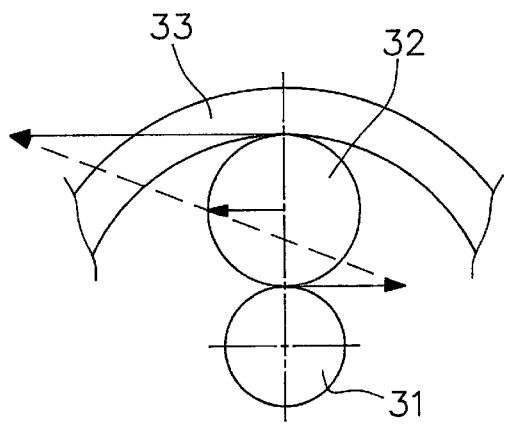
Figure 8:
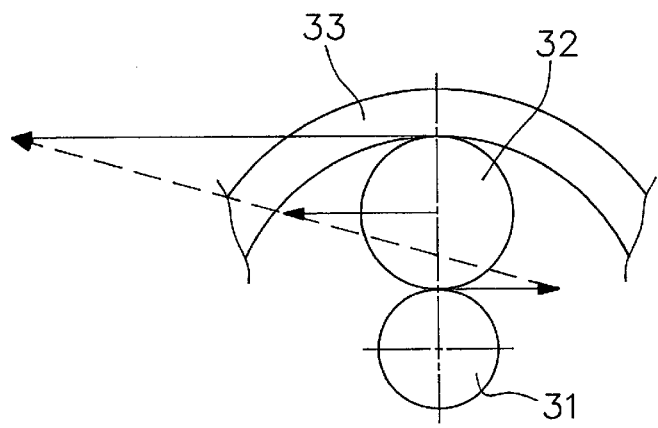

FIGS. 8(a), 8(b) and 8(c) respectively illustrate vector diagrams of the planetary gear device 30. FIGS. 8(a) and 8(b) are vector diagrams respectively with the gearshift lever 140 slightly tilted within the F1 zone and largely tilted within the F1 zone. The rotational speed vector of the outer ring 33 is represented by the combination of the rotational speed vector of the sun gear 31 and the rotational speed vector of the carrier 34 (the orbital speed vector of the planet gear 32). In this regard, the orbital speed of the planet gears 32 remains constant during the mechanical transmission 40 is in the first speed stage, so that the outer ring 33 increases the rotational speed as the rotational speed vector of the sun gear 31 increases, as illustrated in FIGS. 8(a) and 8(b).

Figure 7:
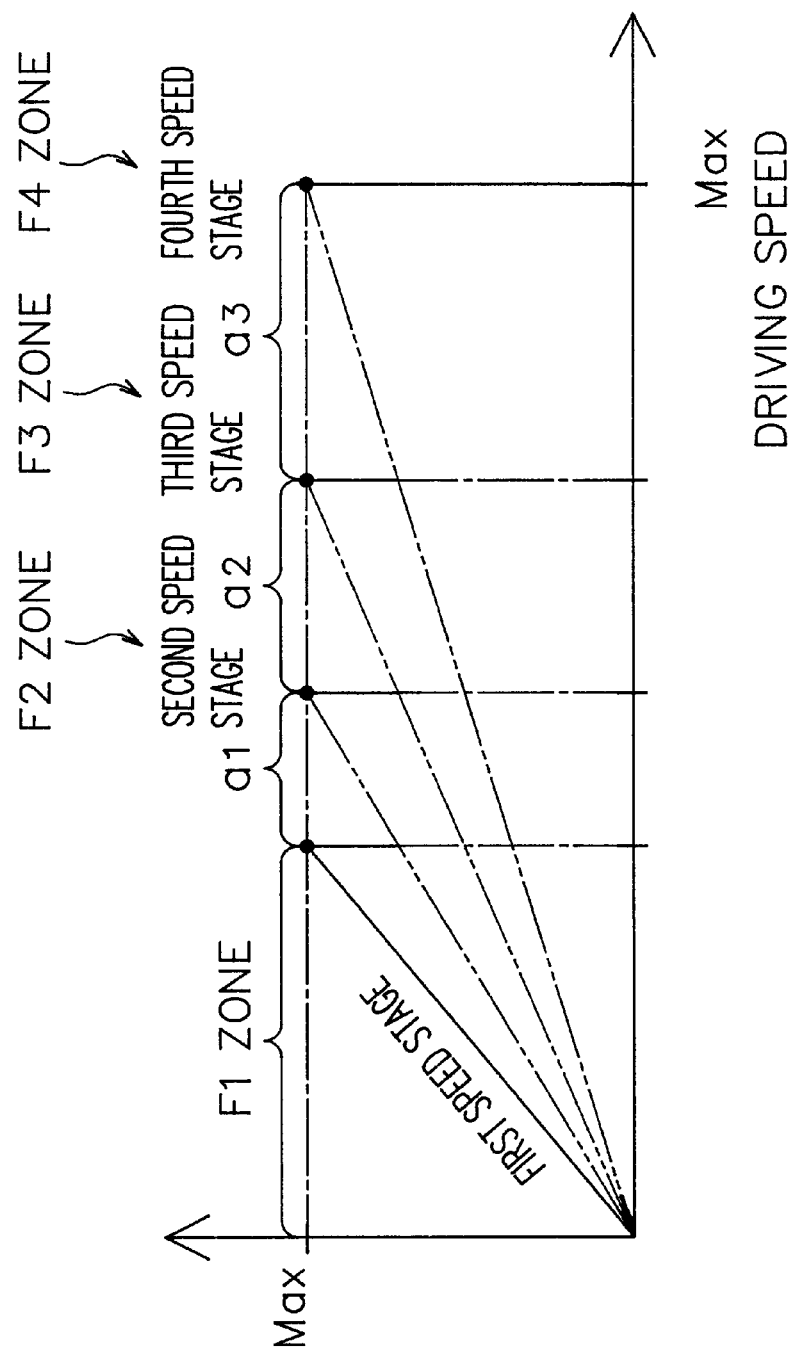
FIG. 7 is a waveform diagram showing the relationship between the speed of the vehicle of FIG. 1 and the tilting angle of the swash plate of the hydraulic pump.

Thus, when the gearshift lever 140 is positioned in the F1 zone, the outer ring 33 increases the rotational speed as the manipulated variable of the gearshift lever 140 increases. Since the driving power to be transmitted to the driving wheels 110 is, as described above, taken out of the outer ring 33, the driving speed increases as the outer ring 33 increases the rotational speed. FIG. 7 illustrates the relationship between the tilting angle of the swash plate 25 of the hydraulic pump 22 and the driving speed. As illustrated in the F1 zone of the FIG. 7, during the gearshift lever 140 is positioned in the F1 zone, specifically, during the mechanical transmission 40 is in the first speed stage, the driving speed is varied according to the tilting angle of the swash plate which is associated with the gearshift lever 140.

Case (ii)

The description will now be made for the case where the gearshift lever 140 is shifted from the F1 zone to the F2 zone, that is, the case where the gearshift lever 140 has reached the point a1.

Similarly to the case (i), the controller 15 determines, based upon the signals from the potentiometer 142, that the gearshift lever 140 has reached the point a1. The controller then correspondingly brings the first selector valve 78a into its pressurized oil discharging position, shuts off the electromagnetic proportional valve 76 and subsequently connects the same again, and brings the second selector valve 78b into its pressurized oil feeding position.

Since the flow regulating valve 91a is interposed within the discharge line 91, as described above, the hydraulic pressure in the first suction line 79a is gradually decreased (OFF (1) in FIG. 6). On the other hand, the hydraulic pressure in the second suction line 79b is gradually increased by the effect of the electromagnetic proportional valve 76 (ON(2) in FIG. 6). The mechanical transmission 40 is shifted up from the first stage, in which the power shift device 43 is engaged, to the second speed stage at the time T1' at which the OFF(1) and the ON(2) are intersected with each other.

On the other hand, when the gearshift lever 140 reaches the point a1, the swash plate 25 of the hydraulic pump 22 reaches the maximum tilting position (Pfmax position). Therefore, even if the gearshift lever 140 is tilted further from the point a1, the swash plate of the HST does not tilt any more. Accordingly, when tilting the gearshift lever 140 further from the point a1, the lever-side coupling rod 134 solely moves to the right hand side in FIG. 3, as the swash-plate-side coupling rod 132 remains unmoved. Specifically, the lever-side-coupling rod 134 moves to the right hand side in FIG. 3 as it compresses the coil spring 135b with its detent piece 34a disposed at the second end.

The gearshift lever 140 is thus plunged into the F2 zone. At this time, the HST 20 remains at the maximum output, while the gearshift lever 140 is solely pivoted.

Considering now the rate vector of the planetary gear device 30 in the case where the gearshift lever 140 is positioned in the F2 zone, or the case where the mechanical transmission 40 is in the second speed stage, it is rendered similar to that as illustrated in FIG. 8(c). Specifically, since the mechanical transmission 40 is in the second speed stage, the rotational speed of the carrier 34 coupled to the driven shaft 42 of the mechanical transmission, or the orbital speed of the planet gears 32 corresponds to the second speed stage of the mechanical transmission. On the other hand, since the output of the HST 20 remains unchanged, the rotational speed of the sun gear 31, which is coupled to the output shaft 23, also remains unchanged. Therefore, the rotational speed of the outer ring 33 is increased by the amount corresponding to the variable in the orbital speed of the planet gears 32.

Figure 9:
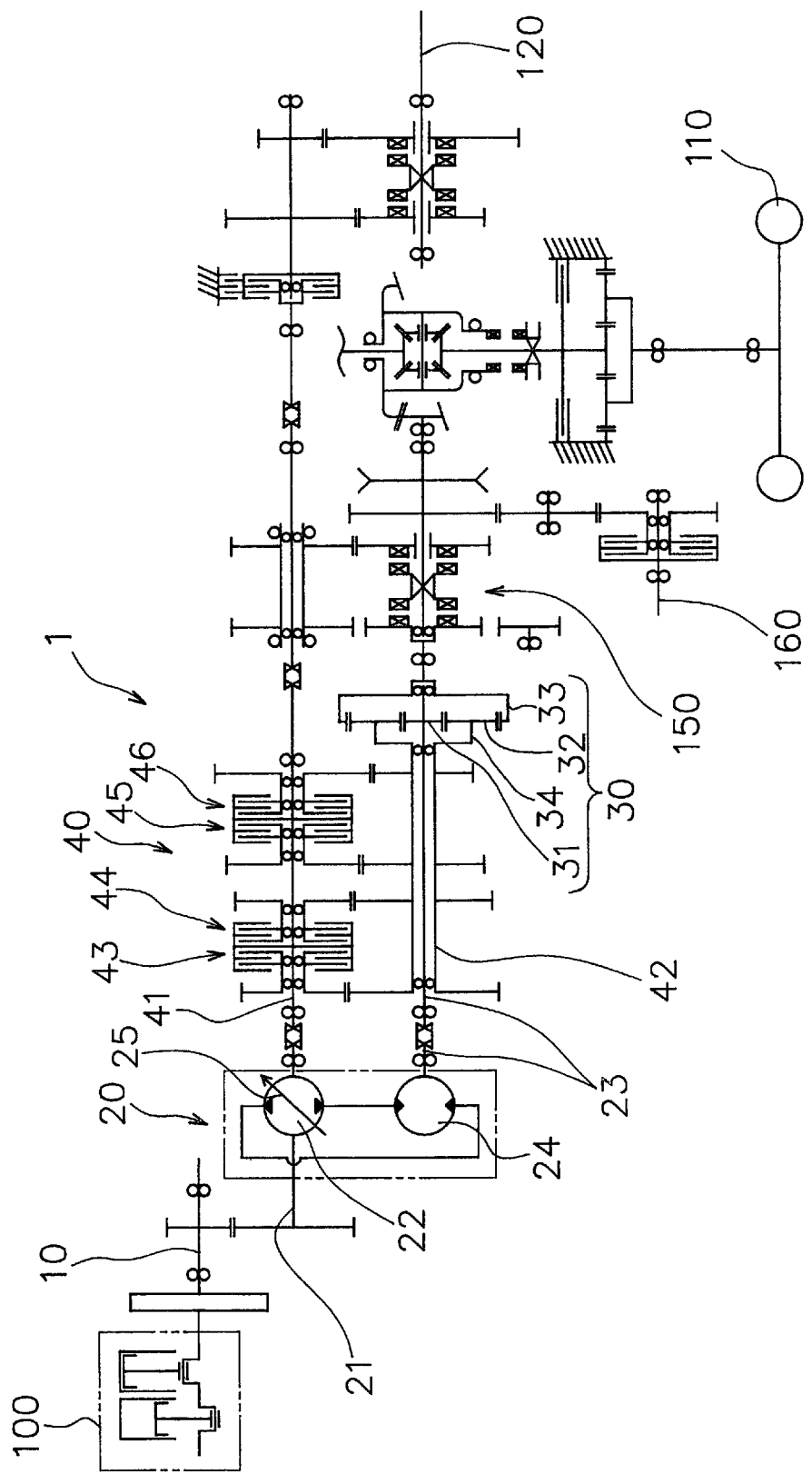
FIG. 9 is a view showing the driving power transmission line of a vehicle, to which a modified example of the drive transmission of FIG. 1 is applied.

Accordingly, in this embodiment, during the gearshift lever 140 is positioned in the F1 zone, or during the mechanical transmission is in the first speed stage, as illustrated in FIG. 9, the driving speed is increased correspondingly to the tilting angle of the swash plate which is associated with the gearshift lever 140. When the gearshift lever 140 then reaches the boundary point a1 between the F1 zone and F2 zone, and hence the mechanical transmission is in the second speed stage, the driving speed is increased by the amount corresponding to the second speed stage of the mechanical transmission. During the gearshift lever is positioned in the F2 zone, the driving speed remains unchanged.

The thus formed transmission according to this embodiment produces the following effects in addition to those as mentioned in the above.

According to the drive transmission equipped with the HST and the mechanical transmission, the driving power of the driving power source is branched to the HST and the mechanical transmission whose outputs are then respectively transmitted to the sun gear 31 and the carrier 34 of the planetary gear device 30, so that the combined output can be taken out of the outer ring 33. This arrangement can reduce the volumes of the HST 20 and the mechanical transmission, as compared with a prior transmission having the arrangement that all the driving power is input to the mechanical transmission through the HST. Specifically, in the prior transmission, the HST and the mechanical transmission are required to have such volumes as to be tolerable against the maximum output of the driving power source. On the contrary, according to the drive transmission of the present invention, the HST and the mechanical transmission each receive only the part of the driving power, so that they can have reduced volumes. This accomplishes the downsizing of the drive transmission and the reduced manufacturing cost thereof.

As described above, the mechanical transmission of this embodiment receives only the part of the driving power from the driving power source 100, thereby limiting the downshift or upshift speed variable of the mechanical transmission even if the mechanical transmission is shifted to a different speed stage during the vehicle runs. Thus, the load applied to the mechanical transmission can be reduced.

The drive transmission of this embodiment also includes the potentiometer 142 as a detecting means of detecting the manipulated variable of the gearshift lever 140, so that the mechanical transmission can be shifted to a different speed stage according to the manipulated variable of the gearshift lever 140. Therefore, a single driving speed changer is enough to operate both the HST 20 and the mechanical transmission 40. This can improve the operationality, as compared with the prior transmission, which requires independent operation of the HST and the mechanical transmission.

According to this embodiment, the tilting range of the swash plate 25 of the hydraulic pump 22 corresponds to the F1 zone of the gearshift lever 140, so that the output of the HST 20 is variable only with the mechanical transmission in engagement with the first speed stage. The present invention is not limited to this arrangement. Rather, the tilting range of the swash plate 25 of the HST 20 can be set to correspond to the F1 zone and the F2 zone of the gearshift lever 140. With this arrangement, the output of the HST 20 can be varied in the first and second speed stages.

According to this embodiment, the driving force is input directly from the main driving shaft 10 to the HST 20. The present invention is not limited to this direct inputting arrangement. Rather, the HST 20 can be equipped with an input shaft 21, to which the main driving shaft 10 is coupled through a suitable driving power transmission mechanism.

In this embodiment, although the main driving shaft 10 is separately formed from the driving shaft 41, and coupled thereto in a non-rotatable manner around the axis, both shafts can integrally be formed. With this arrangement, a portion of the main driving shaft, which supports the power shift devices, functions as the driving shaft.

Although the driving shaft 41 is coaxially disposed to the main driving shaft 10, the present invention is not limited to this coaxial arrangement. For example, when the HST 20 includes the input shaft 21 which is disposed non-coaxially with the main driving shaft 10, as illustrated in FIG. 9, it is possible to have the arrangement that the input shaft 21 is extended, through the HST 20, towards the downstream side and coupled to the driving shaft 41 in a non-rotatable manner around the axis so as to transmit a part of the driving power from the driving power source to the driving shaft 41 via the main driving shaft 10.

This specification is by no means intended to restrict the present invention to the preferred embodiments set forth therein. Various modifications to the drive transmission for vehicles, as described herein, may be made by those skilled in the art without departing from the spirit and scope of the present invention as defined in the appended claims.

What is claimed is:

1. A drive transmission for vehicles which is interposed in a driving power transmission line extending from a driving power source to driving wheels, comprising:

a main driving shaft operatively coupled to said driving power source;

a hydrostatic transmission including a hydraulic pump with an input shaft and a hydraulic motor with an output shaft, at least one of said hydraulic pump and said hydraulic motor being of a variable-displacement type that includes a volume varying operation member, said input shaft adapted to receive a part of driving power of said driving power source, which is branched from said main driving shaft, and said output shaft adapted to output the driving power variable in response to the operation of said volume varying operation member;

a mechanical transmission including a driving shaft and a driven shaft disposed in parallel with said driving shaft, said driving shaft adapted to receive a part of the driving power from the driving power source via said main driving shaft, so as to stepwisely vary the speed between said driving shaft and said driven shaft; and a planetary gear device including a sun gear non-rotatably coupled to said output shaft of said hydrostatic transmission, a carrier non-rotatably coupled to said driven shaft, planet gears in mesh with said sun gear to be moved therearound according to the rotation of said carrier, and an outer ring with an internal gear in mesh with said planet gears;

wherein the driving power to be transmitted to the driving wheels is taken out of said outer ring.

2. A drive transmission for vehicles which is interposed in a driving power transmission line extending from a driving power source to driving wheels, comprising:

a main driving shaft operatively coupled to said driving power source;

a hydrostatic transmission including a hydraulic pump with an input shaft and a hydraulic motor with an output shaft, at least one of said hydraulic pump and said hydraulic motor being of a variable-displacement type that includes a volume varying operation member, said input shaft adapted to receive a part of driving power of said driving power source, which is branched from said main driving shaft, and said output shaft adapted to output the driving power variable in response to the operation of said volume varying operation member;

a mechanical transmission including a driving shaft and a driven shaft disposed in parallel with said driving shaft, said driving shaft adapted to receive a part of the driving power from the driving power source via said main driving shaft, so as to stepwisely vary the speed between said driving shaft and said driven shaft;

a planetary gear device including a sun gear non-rotatably coupled to said output shaft of said hydrostatic transmission, a carrier non-rotatably coupled to said driven shaft, planet gears in mesh with said sun gear to be moved therearound according to the rotation of said carrier, and an outer ring with an internal gear in mesh with said planet gears, said driving power to be transmitted to the driving wheels being taken out of said outer ring;

a driving speed changer for operating said volume varying operation member; and a detecting device for detecting a manipulated variable of said driving speed changer;

wherein said mechanical transmission is shifted to a different speed stage based upon signals from said detecting device.

3. A drive transmission for vehicles according to claim 2 further comprising:

a link mechanism for linking said volume varying operation member with said driving speed changer;

wherein said link mechanism is arranged in such a manner so as to operate said volume varying operation member according to the manipulated variable of said driving speed changer when said mechanical transmission is in a predetermined speed stage, and fix said volume varying operation member into an inoperative mode regardless of the manipulated variable of said driving speed changer when said mechanical transmission is in a speed stage other than said predetermined speed stage.

4. A drive transmission for vehicles which is interposed in a driving power transmission line extending from a driving power source to driving wheels, which comprises:

a main driving shaft operatively coupled to said driving power source;

a hydrostatic transmission including a hydraulic pump with an input shaft and a hydraulic motor with an output shaft, at least one of said hydraulic pump and said hydraulic motor being of a variable-displacement type that includes a volume varying operation member, said input shaft adapted to receive a part of driving power of said driving power source, which is branched from said main driving shaft, and said output shaft adapted to output the driving power variable in response to the operation of said volume varying operation member;

a mechanical transmission including a driving shaft and a driven shaft disposed in parallel with said driving shaft, said driving shaft adapted to receive a part of the driving power from the driving power source via said main driving shaft, so as to stepwisely vary the speed between said driving shaft and said driven shaft; and a planetary gear device including a sun gear non-rotatably coupled to said output shaft of said hydrostatic transmission, a carrier non-rotatably coupled to said driven shaft, planet gears in mesh with said sun gear to be moved therearound according to the rotation of said carrier, and an outer ring with an internal gear in mesh with said planet gears, the driving power to be transmitted to the driving wheels being taken out of said outer ring;

wherein said hydrostatic transmission is arranged so as to receive the driving power directly from said main driving shaft, and said main driving shaft has a rear end portion extending towards a downstream side of said driving power transmission line through said hydrostatic transmission, and said driving shaft of said mechanical transmission is coupled to said rear end portion of said main driving shaft in a non-rotatable manner around the axis.

5. A drive transmission for vehicles which is interposed in a driving power transmission line extending from a driving power source to driving wheels, which comprises:

a main driving shaft operatively coupled to said driving power source;

a hydrostatic transmission including a hydraulic pump with an input shaft and a hydraulic motor with an output shaft, at least one of said hydraulic pump and said hydraulic motor being of a variable-displacement type that includes a volume varying operation member, said input shaft adapted to receive a part of driving power of said driving power source, which is branched from said main driving shaft, and said output shaft adapted to output the driving power variable in response to the operation of said volume varying operation member;

a mechanical transmission including a driving shaft and a driven shaft disposed in parallel with said driving shaft, said driving shaft adapted to receive a part of the driving power from the driving power source via said main driving shaft, so as to stepwisely vary the speed between said driving shaft and said driven shaft, said driven shaft of said mechanical transmission including a cylindrical shape forming a shaft hole therein for rotatably receiving said output shaft of said hydrostatic transmission; and a planetary gear device including a sun gear non-rotatably coupled to said output shaft of said hydrostatic transmission, a carrier non-rotatably coupled to said driven shaft, planet gears in mesh with said sun gear to be moved therearound according to the rotation of said carrier, and an outer ring with an internal gear in mesh with said planet gears, the driving power to be transmitted to the driving wheels being taken out of said outer ring, said planetary gear device being disposed coaxially to said driven shaft and said output shaft.

6. A drive transmission for vehicles which is interposed in a driving power transmission line extending from a driving power source to driving wheels, which comprises:

a hydrostatic transmission including a hydraulic pump with an input shaft adapted to operatively receive a part of driving power from said driving power source and a hydraulic motor with an output shaft, at least one of said hydraulic pump and said hydraulic motor being of a variable-displacement type that includes a volume varying operation member;

a mechanical transmission including a driving shaft and a driven shaft for stepwisely varying the speed between said driving shaft and said driven shaft, said driving shaft adapted to operatively receive a part of the driving power from the driving power source; and a planetary gear device including a sun gear, a carrier, planet gears and an outer ring formed with an internal gear in mesh with said planet gears, said sun gear non-rotatably supported on said output shaft of said hydrostatic transmission and said carrier non-rotatably supported on said driven shaft;

wherein the driving power to be transmitted to said driving wheels is taken out of said outer ring.

7. A drive transmission for vehicles according to claim 6 further comprising:

a driving speed changer for being manipulated by a rider to operate said volume varying operation member;

a detecting device for detecting the manipulated variable of said driving speed changer;

a link mechanism for linking said volume varying operation member with said driving speed changer; and said mechanical transmission being operated to be shifted to a different speed stage according to signals from said detecting device;

wherein said link mechanism is arranged in such a manner so as to operate said volume varying operation member according to the manipulated variable of said driving speed changer when said manipulated variable of said driving speed changer is within a predetermined range.

* * * * *